US011288297B2

(12) United States Patent
Milenova et al.

(10) Patent No.: US 11,288,297 B2
(45) Date of Patent: Mar. 29, 2022

(54) EXPLICIT SEMANTIC ANALYSIS-BASED LARGE-SCALE CLASSIFICATION

(71) Applicant: Oracle International Corporation, Redwood Shores, CA (US)

(72) Inventors: Boriana Milenova, Reading, MA (US); Alexander Sakharov, Framingham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 984 days.

(21) Appl. No.: 15/825,930

(22) Filed: Nov. 29, 2017

(65) Prior Publication Data

US 2019/0163817 A1 May 30, 2019

(51) Int. Cl.
*G06F 16/34* (2019.01)
*G06N 5/04* (2006.01)
*G06N 20/00* (2019.01)
*G06F 16/35* (2019.01)
*G06F 16/31* (2019.01)

(52) U.S. Cl.
CPC .......... *G06F 16/345* (2019.01); *G06F 16/313* (2019.01); *G06F 16/35* (2019.01); *G06F 16/353* (2019.01); *G06N 5/04* (2013.01); *G06N 20/00* (2019.01)

(58) Field of Classification Search
CPC ...... G06F 16/353; G06F 16/345; G06F 16/35; G06F 16/313; G06N 5/02; G06N 5/04; G06N 20/00
See application file for complete search history.

(56) References Cited

U.S. PATENT DOCUMENTS

| 6,789,069 | B1 * | 9/2004 | Barnhill | G06K 9/623 706/12 |
| 8,489,603 | B1 * | 7/2013 | Weissgerber | G06F 16/285 707/737 |
| 2006/0080311 | A1 * | 4/2006 | Potok | G06F 16/355 |
| 2008/0027926 | A1 * | 1/2008 | Diao | G06F 16/345 |
| 2009/0274376 | A1 * | 11/2009 | Selvaraj | G06K 9/6269 382/224 |
| 2012/0089621 | A1 * | 4/2012 | Liu | G06F 16/335 707/749 |

(Continued)

OTHER PUBLICATIONS

"Wikipedia-based Semantic Interpretation for Natural Language Processing" Journal of Artificial Intelligence Research, vol. 34, pp. 443-498, 2009 (Year: 2009).*
Wong et al., "A Vector Space Model for Automatic Indexing" Information Retrieval and Language Processing, Communications of ACM, dated Nov. 1975, vol. 18, No. 11, 8 pages.

(Continued)

*Primary Examiner* — Michael J Huntley
*Assistant Examiner* — Jaeyong J Park
(74) *Attorney, Agent, or Firm* — Hickman Becker Bingham Ledesma LLP

(57) ABSTRACT

Approaches for large-scale classification and text summarization. In one embodiment, for example, the approach for large-scale classification includes predicting relevant classes of a new unseen case based on a classification model that is learned from a given knowledge base comprising labeled training data items. In another embodiment, for example, the approach for text summarization includes repurposing explicit semantic analysis (ESA) techniques for computing a text summary of a given text document.

24 Claims, 8 Drawing Sheets

(56) References Cited

U.S. PATENT DOCUMENTS

| | | | | |
|---|---|---|---|---|
| 2013/0158982 | A1* | 6/2013 | Zechner | G10L 15/1815 |
| | | | | 704/9 |
| 2016/0180200 | A1* | 6/2016 | Vijayanarasimhan | |
| | | | | G06N 3/082 |
| | | | | 382/157 |
| 2016/0187022 | A1* | 6/2016 | Miwa | G01V 8/10 |
| | | | | 250/349 |
| 2017/0091692 | A1* | 3/2017 | Guo | G06N 5/003 |
| 2017/0344822 | A1* | 11/2017 | Popescu | G06F 16/56 |
| 2018/0175975 | A1* | 6/2018 | Um | H04W 24/10 |

OTHER PUBLICATIONS

Partalas et al., "LSHTC: A Benchmark for Large-Scale Text Classification", dated Mar. 30, 2015, 9 pages.

Gabrilovich et al., "Overcoming the Brittleness Bottleneck using Wikipedia: Enhancing Text Categorization with Encyclopedic Knowledge", dated 2006, 6 pages.

Gabrilovich et al., "Computing Semantic Relatedness using Wikipedia-based Explicit Semantic Analysis", dated Jan. 6, 2007, 6 pages.

Gabrilovich et al. "Wikipedia-based Semantic Interpretation for Natural Language Processing", Journal of Artificial Intelligence Research 34 dated (2009) pp. 443-498.

Dong-Hyun Lee, "Multi-Stage Rocchio Classification for Large-scale Multilabeled Text data", 8 pages.

"Rocchio Classification", https://nlp.stanford.edu/IR-book/html/htmledition/rocchio-classification-1.html, last viewed on Jul. 6, 2017, 6 pages.

* cited by examiner

EXPLICIT SEMANTIC ANALYSIS-BASED LARGE-SCALE CLASSIFICATION

TECHNICAL FIELD

The technical field of this invention is a computer-implemented approaches for large-scale classification and semantic text summarization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

CLASSIFICATION OVERVIEW

Computers are very powerful tools for performing a wide-variety of data mining tasks. One type of data mining task that computers are useful for is classification. Classification is a data mining function that assigns items in a collection to classes. A common goal of classification is to accurately predict the class for a case. For example, a classification model could be used to identify loan applicants as low, medium, or high credit risks. Classification has many applications in customer segmentation, business modeling, marketing, credit analysis, biomedical and drug response modeling, as well as other technical fields.

Credit risk classification is an example of a multiclass classification problem. A multiclass classifier distinguishes between more than two classes (e.g., low, medium, high, or unknown credit rating). Another type of classification problem is binary classification. A binary classifier distinguishes between only two possible classes. For example, in the context of information retrieval, a binary classification problem might involve determining whether a given case should or should not be included in a result set for a given query.

Whether a multiclass classification problem or a binary classification problem, a classification task typically begins with a data set in which the class assignments are known. For example, a classification model that predicts credit risks could be developed based on observed data for many loan applications over a period of time. In addition to the historical credit rating, the data might track employment history, home ownership or rental, years of residence, number and type of investments, and so on. Various different credit ratings would be the classes, the other attributes would be the predictors, and the data for each customer would be the cases to classify.

In the model build (training) process, a classification algorithm finds relationships between the values of the predictors and the values of the classes. Different classification algorithms may use different techniques for finding relationships. These relationships are summarized in a model, which can then be applied to a different data set in which the class assignments are unknown. Scoring a classification model typically results in at least one class assignment for each case.

In the above examples of multiclass classification and binary classification, each case is assigned to just one class. However, it is also possible for a classifier to output multiple classes for each case. For example, a document classifier may be trained to recognize multiple document topics. Then, when a given document case is input to the document classifier, it may output a binary label for each of the multiple topics that specifies whether the respective topic is or is not relevant to the given document. Such a classifier that outputs multiple binary labels is sometimes referred to as a "multilabel" classifier. Multiclass labels may be output instead of binary labels. This type of multilabel classifier where each label can be multiclass is sometimes referred to as a "multioutput" classifier.

Feature Extraction Using Explicit Semantic Analysis (ESA)

Another type of data mining task that computers are useful for is feature extraction. Feature extraction is type of a dimensionality reduction for representing interesting aspects of a data set as feature vectors. One existing technique for feature extraction is known as Explicit Semantic Analysis (ESA). ESA uses concepts of a knowledge base as features. Typically, an encyclopedic database such as Wikipedia or a database of topics in a certain domain is used as the knowledge base.

With ESA implementations, concepts of the knowledge base are typically available as text documents containing words. For example, a single Wikipedia article may represent a concept. For feature extraction, a matrix of features and words is constructed. The rows of the matrix correspond to the features. The columns of the matrix correspond to the words. FIG. 1 includes a table representation of a matrix 102 for feature extraction. Each cell of the matrix 102 contains a word weight. The word weight represents a strength of association between the word respective to the cell's column and the feature respective to the cell's row.

To determine the most relevant features for a given text document using ESA, the cosine similarity between pairs of vectors is computed, one pair for each feature represented in the matrix 102. One vector in each of the pairs remains constant and represents the given text document as a vector of word weights representing strengths of association between words of the text document and the text document as a whole. The other vector in each of the pairs is based on a row of the matrix 102. A cosine similarity between the vectors of each pair is computed. The cosine similarities are sorted and one or more features with the closest similarity to the text document are selected relevant features.

More information on using ESA for feature extraction can be found in the paper by Evgeniy Gabrilovich and Shaul Markovitch, entitled "Overcoming the brittleness bottleneck using Wikipedia: enhancing text categorization with encyclopedic knowledge," published in 2006 in Proc. 21st National Conference on Artificial Intelligence (AAAI) on Pages 1301-1306.

Rocchio Classification

Recently, with the explosive growth of digital data storage capacity, there emerged a desire for large-scale classification. With current computing power, a large-scale classification task may involve up to tens or hundreds of thousands or more classes. The challenge with such a task is achieving both scalability and performance.

One approach for large-scale classification is commonly known as Rocchio classification. Rocchio classification is a method to predict the class of a case. Initially, a centroid of each class is computed from vector space representations of the training data items belonging to the class. A vector space representation of the case is also computed.

The vector space model is an algebraic model for representing text documents as vectors of n-grams extracted from the text documents. The vector space model is often applied to information retrieval tasks such as indexing. The vector space model was proposed by G. Salton, A. Wong, and C. S. Yang in the 1975 paper "A Vector Space Model for Automatic Indexing," Association for Computing Machinery, November 1975, Volume 18, Number 11, Pages 613-620, the entire contents of which is hereby incorporated by reference. An n-gram is a sequence of n items from a text document. The items can be phonemes, syllables, letters, whole words, base pairs, etc.

Returning to Rocchio classification, once the class centroids are computed, the class for the case is predicted as the one which is "closest" to the case according to a cosine similarity measure. A cosine similarly measure is typically used so that evaluation of sparse vector space representations is more efficient.

A technical challenge faced by Rocchio classification implementations is efficiently scaling to a large number of classes such as, for example, tens or hundreds of thousands or more classes. A particular challenge involves the memory space required (e.g., volatile and/or non-volatile memory) to store the scoring model that includes a representation of each class centroid. The centroid representation for a class can be relatively dense. The centroid representation typically includes one non-zero weight for each distinct non-zero weighted attribute in the superset of all training data items belonging to the class. Thus, the storage size of the scoring model is on the order of the superset of all non-zero weights in all class centroids. When the total number of candidate classes is in the tens or hundreds of thousands or more, model load and scoring times can be too slow for many large-scale classification tasks such as, for example, tasks involving classifying a continuous stream of cases in real-time. Further, a Rocchio model may not be sufficiently robust to noise and/or have poor prediction accuracy.

More information on Rocchio classification is available on the Internet at/IR-book/html/htmledition/rocchio-classification-1.html in the nlp.stanford.edu domain.

DETAILED DESCRIPTION

Figure 1:
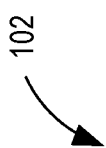
FIG. 1 includes a table representation of a matrix as in some prior art implementations of using explicit semantic analysis for feature extraction.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

General Overview

An approach for large-scale classification is disclosed. The approach includes a system and method for selecting relevant classes of a new unseen case. The system and method can suggest multiple classes relevant to the new case based on a classification model that is learned from a given knowledge base comprising labeled training data items.

In some implementations, the approach involves representing the training data items in a conceptual space constituted of explicit classes extracted from the given knowledge base. Each class is represented by a "class" vector comprising attribute weights aggregated from vector representations of the training data items belonging to the class. Each aggregated attribute weight of a class vector represents a strength of association between the respective attribute and the respective class. In some implementations, the training data items are text documents, the attributes include non-stop words or n-grams in the text documents, and the attribute weights aggregated in the class vectors are computed using a term frequency/inverse document frequency weighting scheme (TF/IDF).

The approach involves a modeling step and a classification step. During the modeling step, a sparse matrix is created. The sparse matrix is constructed such that the rows of the matrix are the class vectors, the columns of the matrix represent attributes, and a cell of the matrix may contain an aggregated attribute weight. An aggregated attribute weight in a cell is from the respective class vector of the cell's row for the respective attribute of the cell's column. The aggregated attribute weight represents the strength of association between the respective class and the respective attribute. In some cases, there may be no association between a given class and a given attribute. In this case, the aggregated attribute weight in the cell is zero. Hence, the matrix may be sparse.

To classify a given case, it is first represented as a "case" vector of weighted attributes of the case. The case vector is computed by identifying and weighting attributes of the case. After the case vector is formed, a similarity measure (e.g., cosine similarity) between pairs of vectors is computed. The similarity measure is computed for each pair. In particular, the similarly measure is computed for classes represented in the sparse matrix. Each pair of vectors includes the formed case vector and the class vector from a row of the sparse matrix. The computed similarity measures are sorted. After sorting, one or more classes with a similarity measure above a threshold are selected as predicted class(es) for the case.

As used herein, a threshold is a specified value or a specified set of values against which a value for an item under comparison is compared. As used herein, "being above a threshold" means that a value for an item under comparison is above a specified other value, that an item under comparison is among a certain specified number of items with the largest value, or that an item under comparison has a value within a specified top percentage amount. As used herein, "being below a threshold" means that a value for an item under comparison is below a specified other amount, that an item under comparison is among a certain specified number of items with the smallest value, or that an item under comparison has a value within a specified bottom percentage amount. Relative terms, such as "high" or "unimportant", when not otherwise defined, can be understood as assigning a value and determining how that value compares to an established threshold.

An approach for text summarization is also disclosed.

Modeling and Classification Steps

Figure 2:
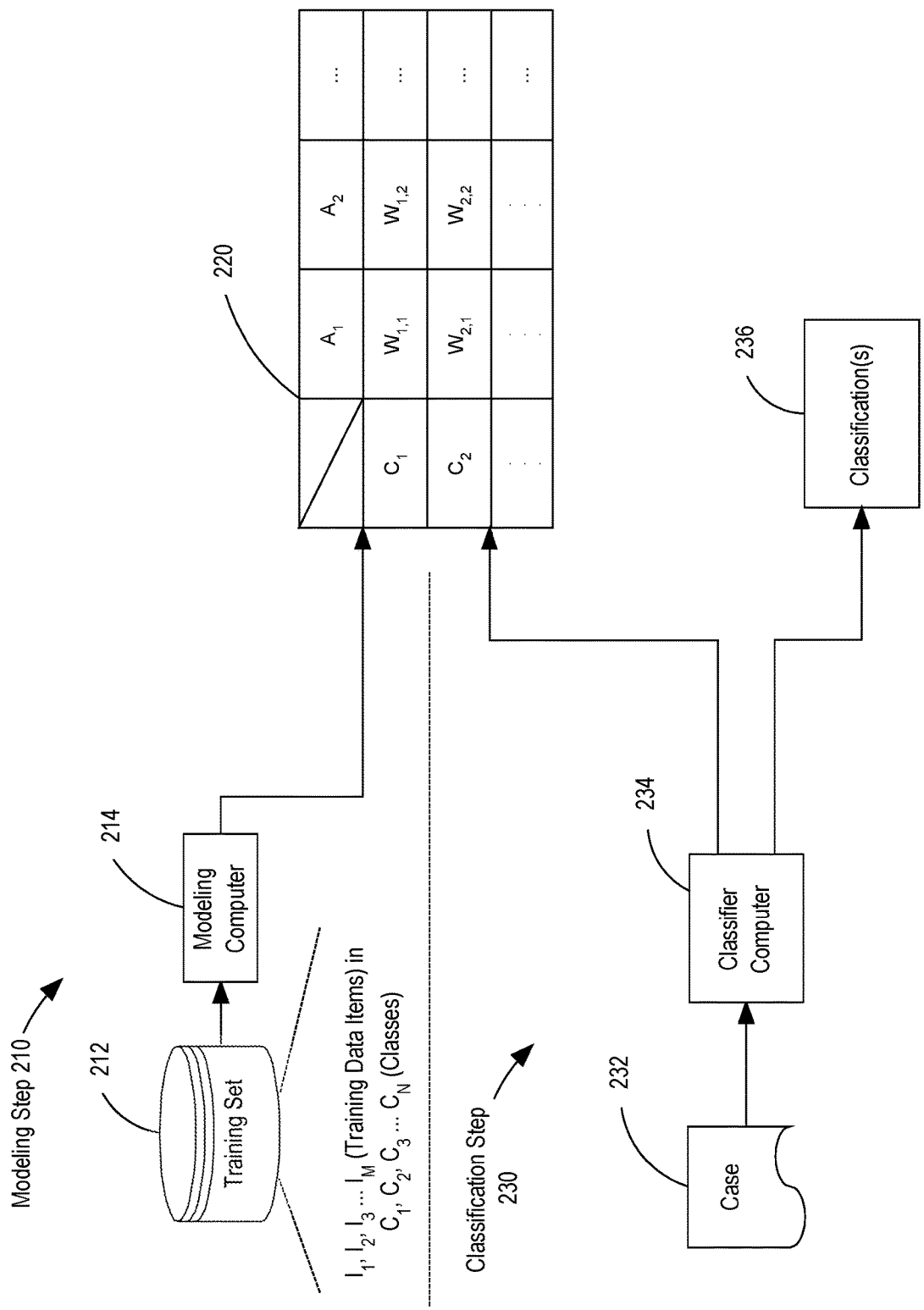
FIG. 2 is a schematic diagram of modeling and classification steps, according to some implementations of the present invention.

FIG. 2 is a schematic diagram of modeling 210 and classification 230 steps according to some implementations of the present invention. Both the modeling 210 and classification 230 steps may be implemented by a computing system. The computing system may comprise one or more processors (e.g., CPUs, SoCs, etc.) and storage media (e.g., volatile and/or non-volatile memory devices). The storage media may store one or more programs executed by the one or more processors to perform the steps 210 and 230.

The computing system may include a single computing device like, for example, computer system 700 described below with respect to FIG. 7. Alternatively, the computing system may include multiple, interconnected computing devices that are interconnected by one or more data networks in a suitable computing arrangement such as, for example, in a distributed computing arrangement within one or more data center or other computer hosting facilities. Where multiple computing devices are used, there is not necessarily a requirement that each computing device be interconnected to every other computing device, although such a configuration may be used. Further, while the logic of the modeling and classification steps 210 and 230 may be implemented entirely in software, the logic may instead be implemented entirely in hardware or implemented with a combination of hardware and software.

FIG. 2 depicts a modeling computer 214 and classifier computer 234. The modeling computer 214 and the classifier computer 234 may be the same computing device or the same set of computing devices, an overlapping set of computing devices, or distinct sets of one or more computing devices.

Training Set

Explicit knowledge often exists in text form. Multiple knowledge bases are available as collections of text documents. These knowledge bases can be generic such as, for example, the well-known Wikipedia collection available on the Internet in the wikipedia.org domain. Alternatively, a knowledge base can be domain-specific such as, for example, specific to a medical, engineering, or other technical field.

For the modeling step 210, a database 212 stores a training set of training data items I1 through IM. The training set may be based on a knowledge base. The knowledge base may be provided by a collection of text documents. The collection of text documents may pertain to a particular domain of knowledge. The particular domain of knowledge may be a particular technical field. For example, the particular technical field may be a medical, engineering, or financial field.

In some implementations, a training data item in the training set is a text document. A text document is not limited to written language words and may include other human-readable text-based content such as numbers, tables, charts, formulas, equations, and symbols. In some implementations, a training data item in the training set is represented in the database 212 according to the bag-of-words model. The bag-of-words model is a representation of a text document whereby the text document is represented as a distinct set of n-grams, potentially disregarding grammar, certain stop words, and the order of the n-grams within the text document but retaining cardinality of the n-grams. A bag-of-words representation may take the form of a sparse vector of occurrence counts (e.g., term frequencies) of distinct n-grams within the text document.

While in some implementations a training data item in the training set is a text document, it should be understood that a training data item is not limited to being a text document. For example, the training data items can be images or other numerical or categorical data.

Classes

As stored, each training data item in the training set may be labeled with one or more of N total number of classes C1 through CN. In some implementations, the total number N of target classes numbers in the tens of thousands or more (e.g., in the hundreds of thousands).

Although not required, the labeling of a training data item in the training set may be human endorsed. That is, in the process of labeling a training data item with a class, one or more humans implicitly or explicitly endorse as accurate the assignment of the label to the training data item.

Implicit approval can be inferred from the content of the training data item. That is, the label may be intrinsic to the training data item itself. For example, if the training data item is a text document, then a label may be taken from the document's title known or assumed to have been authored by a human, or if the content of the training data item is such that it otherwise intrinsically contains a category or class label assigned to it by a human, then a label may be taken from content of the training data item itself.

Explicit approval may be received by a human assigning a label to a training data item. Express label assignment may be manual or partially automated. For example, a label may be automatically recommended by a computer system that attempts to predict a proper label or labels for the training data item such as, for example, via a machine learning process. In this case, a human, through appropriate user input, may ultimately approve of the machine-recommended label, or assign an alternative label.

Whether implicitly or explicitly endorsed, because the labels assigned to the training data items in the training set are human endorsed, such labels may reflect the current superiority of human judgement, common sense, knowledge, and experience over computer-based processes in understanding the meaning and context of the training data items for purposes of classification.

In some implementations, a training data item labeled in database 212 with an identifier of a class is considered to "belong to" the identified class. In some implementations, a training data item implicitly belongs to a class even if the training data item is not expressly labeled in the database 212 with an identifier of the class. This is possible if there exists a hierarchical relationship between classes. For example, the hierarchical relationship may be established according to a domain-specific ontology. For example, if a class $C_1$ that a training data item is not labeled with in the database 212 is a parent or ancestor class of the class $C_2$ that the training data item is labeled with in the database 212, then the training data item may be considered to belong to class $C_1$ in addition to class $C_2$ even though the training data item is not labeled in the database 212 with class $C_1$.

Alternatively, a training data item may be considered to belong to only the class(es) that the training data item is labeled with in the database 212, if the requirements of the implementation at hand dictate such. According to this alternative, if class $C_1$ is a parent class of class $C_2$ but a training data item is labeled with class $C_2$ but not class $C_1$, then the training data item is considered to belong to class $C_2$ and is not considered to belong to class $C_1$ despite the hierarchical relationship.

Although classes C1 through CN may have hierarchical relationships with one another according to an ontology or hierarchical classification scheme, hierarchical relationships are not required in an implementation of the present invention and classes C1 through CN can be distinct from one another without any hierarchical relationships between them.

As discussed, a training data item in the training set may belong to just one class or to more than one class. It should be noted, however, that reference herein to multi-target classification refers to the ability of the classification step 230 to classify a given case 232 into more than one class. This ability may exist independent of whether training items belong to (e.g., are labeled with) more than one class.

Training Data Item Vectors

In some implementations, modeling computer 214 generates a vector space model representation of each training data item in the training set to produce a set of M total number of item vectors IV1 through IVM, one item vector for each training data item in the training set.

In some implementations, an item vector is a weighted vector of distinct attributes of the corresponding training data item. The attributes in the item vector may be weighted according to the importance of the attributes to the corresponding training data item relative to the importance of the attributes to the entire training set. For example, if a training data item is a text document, then the attribute weights in an item vector representing the text document may be computed according to a term frequency-inverse document frequency (TF/IDF) measure. The attributes may, for example, distinct n-grams (e.g., words) identified in the text document. In some implementations, attributes are word embeddings generated based on n-grams (e.g., words) identified in the text document. A word embedding, generally, is a dense distributed vector representation of an n-gram that allows n-grams with similar meaning to have a similar representation. More specifically, word embeddings are a class of techniques where individual n-grams (e.g., words) are represented as real-value vectors in a predefined vector space such as, for example, a vector space representing Wikipedia topics. Word embeddings are useful to capture the context of a word.

While in some implementations the modeling computer 214 generates a vector space model representation of each training data item in the training set, the database 212 stores a pre-computed item vector for each training data item the training set. In this case, the modeling computer 214 can retrieve the item vectors directly from the database 212 without having to compute the attribute weights.

Figure 3:
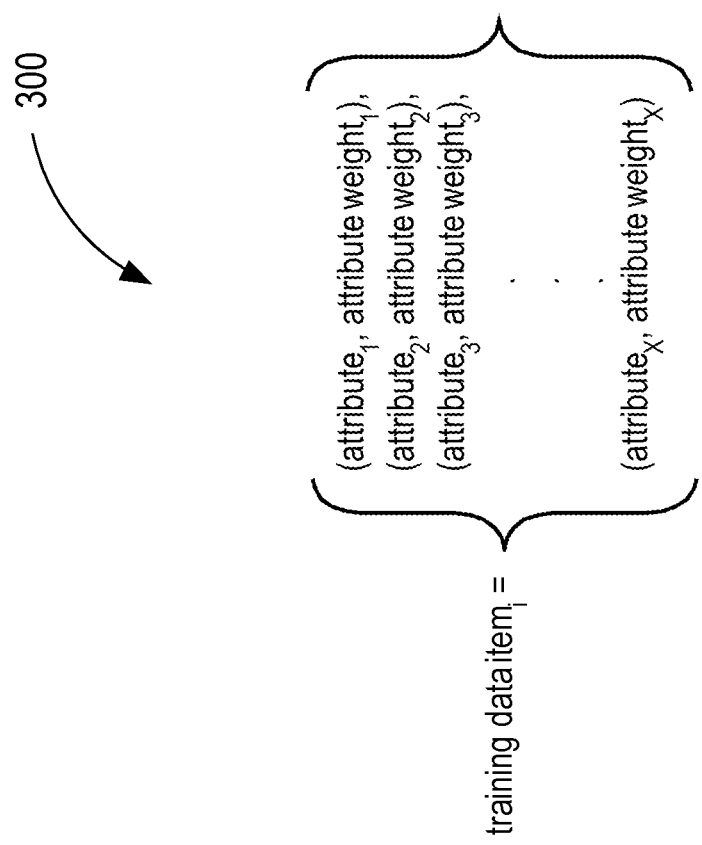
FIG. 3 is a schematic representation of a training data item vector, according to some implementations of the present invention.

FIG. 3 is a schematic representation of a training data item vector 300 for representing a training data item in the training set, according to some implementations. The vector 300 includes X number of pairs of distinct attributes and attribute weights. Here, X is the number of distinct attributes taken from the training data item. It should be noted that X may be less than the total number of possible attributes of the training data item. For example, for a text training data item, the number X may reflect the number of distinct words taken from the training data item after stemming and lemmatizing the words and ignoring stop words and punctuation. More generally, candidate attributes taken from the training data item may be filtered out or omitted from the item vector representation of the training data item according to the requirements of the particular implementation at hand.

An attribute weight paired with an attribute in the vector 300 reflects the strength of association between the attribute and the training data item represented by the vector 300. The vector 300 may be encoded in a computer storage media as an array or other suitable data structure.

It should be noted that a particular encoding of a vector 300 in a computer storage media may omit a representation of the attributes in order to conserve storage space. In this case, the encoding of the vector 300 may include a list of attribute weights where the position of an attribute weight in the list specifies which attribute the attribute weight is paired with. Other lossless encodings of the vector 300 that reduce storage requirements are possible and the present invention is not limited to any particular encoding.

A possible computer storage media encoding of a set of item vectors 300 is as a sparse matrix where each row of the matrix corresponds to one of the item vectors in the set and each column of the matrix corresponds to one distinct attribute in the superset of all attributes in the set of item vectors. The matrix is sparse because it is likely that not all item vectors in the set have the same set of distinct attributes. Thus, the weights for some attributes in some item vectors may be zero. An advantage of encoding a set of item vectors as a sparse matrix is that a compressed sparse matrix format may be used to store only the non-zero weights in the matrix and thereby conserve computer storage space. Non-limiting examples of representing a sparse matrix in computer storage media include a two-dimensional array format, dictionary-of-keys format, lists of lists format, coordinate list format, compressed sparse row format, and compressed sparse column format.

Attribute Weighting

In some implementations, the training data items I1 through IM are each text documents, the attributes of an item vector representing a text document are n-grams extracted from the text document, and the attribute weights of the vector are BM25 scores for the n-grams.

BM25 is a known bag-of-words retrieval function that ranks a set of text documents. A prominent instantiation of the function may be represented as:

$$\sum_{i=1}^{k} IDF(q_i) \cdot \frac{f(q_i, d) \cdot (k+1)}{f(q_i, d) + k\left(1 - b + b\frac{L_d}{L_{avg}}\right)}$$

According to the above equation, given a query Q, containing terms $q_1, \ldots, q_k$, the BM25 score of a text document d may be represented according to the above function. Here, $f(q_i, d)$ represents $q_i$'s term frequency in the text document d, $L_d$ represents the length of the document d in number of terms, and $L_{avg}$ represents the average length in the training corpus. K and b are free parameters. $IDF(q_i)$ represents the inverse document frequency weight of the query term $q_i$, which is typically represented as:

$$\log \frac{M - m(q_i) + 0.5}{m(q_i) + 0.5}$$

M represents the total number of documents in the training set. And $m(q_i)$ represents the number of documents in the training set containing the term $q_i$.

In some implementations, the BM25 score is taken as an n-gram weighting scheme, and not as a retrieval function or similarity measure, to adapt it to classification. For example, an attribute weight in vector 300 for a given n-gram t of a given training data item document d may be represented as:

$$\frac{(k+1)tf_{t,d}}{tf_{t,d} + k\left(1 - b + b\frac{L_d}{L_{avg}}\right)} \cdot \log \frac{M - df_t + 0.5}{df_t + 0.5}$$

Here, $tf_{t,d}$ represents the frequency of n-gram t in document d. And $df_t$ represents the document frequency of n-gram t in the training set I1 through IM. Parameters M, k, b, $L_d$, and $L_{avg}$ are as before. In some implementations, k is approximately 1.5 and b is approximately 0.75.

The preceding is one example of a possible term frequency-inverse document frequency (TF/IDF) measure that may be used to weight attributes of an item vector (e.g., item vector 300.) Other statistical measures that reflect how important an attribute is to a training data item in a corpus of training data items may be used. For example, other TF/IDF variations such as BM25F that takes anchor text into account may be used with certain types of training data items such as, for example, web pages or other set of hyperlinked documents.

Class Aggregation

Once the set of item vectors in the training set is available, the modeling computer 214 aggregates the item vectors in the training set by class to generate a class vector for each class C1 through CN to produce a set of N total number of class vectors CV1 through CVN. By aggregating the item vectors by class in this way, a more compact representation of the classes is produced, and thereby reducing the memory storage requirements for storing the inverted index 216.

In some implementations, the item vectors are aggregated by class according to the classes to which the training data items in the training set belong. For example, for a given class C, the class vector CV for class C may be generated by aggregating all the item vectors representing training data items that belong to class C.

In some implementations, aggregating a set of item vectors belonging to a given class C involves summing attribute weights per attribute. In particular, the class vector for the class C may include an aggregated weight for each distinct attribute in the superset of all attributes across all item vectors belonging to the class C. The aggregated weight for a given attribute may be taken as the sum of the attribute's weights across all item vectors belonging to the class C. However, the aggregated weight may be computed other than by the sum. For example, the aggregated weight for a given attribute may be taken as the arithmetic or geometric average or other mathematical combination of the attributes' weights across all item vectors belonging to the class C.

Unit Length Normalization

In some implementations, before aggregating item vectors by class, each item vector in the training set may be normalized for unit length so as to eliminate bias toward longer training data items (e.g., training data items with relatively more distinct attributes). For example, each of the item vectors may be length normalized according to their $l_1$ norm (e.g., Manhattan norm) or $l_2$ norm (e.g., Euclidean norm). More generally, for a given item vector, each weighted attribute of the item vector may be divided by a norm of the item vector.

In some implementations, before aggregating item vectors by class, attribute weights in the item vectors in the training set that are below a threshold are filtered out (discarded). This filtering can occur before and/or after unit length normalization, or can occur independent of whether the item vectors are unit length normalized. This filtering can speed up aggregation of the item vectors because fewer attributes are aggregated. This filtering can also reduce the storage size of the class-attribute sparse matrix 220, if the filtering results in one or more attributes being filtered (discard) entirely across all the item vectors that belong to a class.

Class Vector

Figure 4:
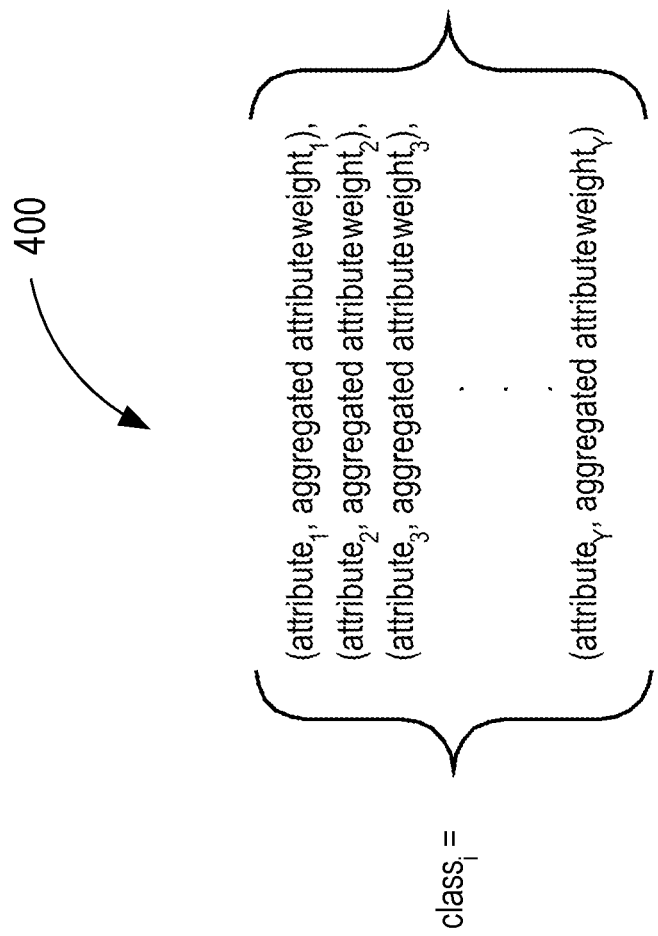
FIG. 4 is a schematic representation of a class vector, according to some implementations of the present invention.

The modeling computer 214 may aggregate all item vectors that belong a class to form a class vector representing the class. FIG. 4 is a schematic representation of a class vector 400 according to some implementations of the present invention. The vector 400 includes Y number of pairs of distinct attributes and corresponding aggregated weights. The number Y for a class vector 400 representing a class C may equal the number of distinct attributes in the superset of all attributes in the item vectors that belong to the class C, possibly after filtering the item vectors as described above. Each attribute in the class vector 400 paired with its aggregated weight, as discussed above.

An aggregated weight paired with an attribute in a class vector 400 reflects the strength of association between the attribute and the class represented by the class vector 400. The vector 400 may be encoded in a computer storage media as an array or other suitable data structure.

It should be noted that a particular encoding of a vector 400 in a computer storage media may omit a representation of the attributes in order to conserve storage space. In this case, the encoding of the vector 400 may include a list of attribute weights where the position of an attribute weight in the list specifies which attribute the attribute weight is paired with. Other lossless encodings of the vector 400 that reduce storage requirements are possible and the present invention is not limited to any particular encoding.

A possible computer storage media encoding of a set of class vectors 400 is as a sparse matrix where each row of the matrix corresponds to one of the class vectors in the set and each column of the matrix corresponds to one distinct attribute in the superset of all attributes in the set of class vectors. The matrix is sparse because it is likely that not all class vectors in the set have the same set of distinct attributes. Thus, the weights for some attributes in some class vectors may be zero. An advantage of encoding a set of class vectors as a sparse matrix is that a compressed sparse matrix format may be used to store only the non-zero weights in the matrix and thereby conserve computer storage space. Non-limiting examples of representing a sparse matrix in computer storage media include a two-dimensional array format, dictionary-of-keys format, lists of lists format, coordinate list format, compressed sparse row format, and compressed sparse column format.

Class-Attribute Matrix

For the classification step 230, the set of class vectors CV1 through CVN may be stored as class-attribute sparse matrix 220. Each row of the sparse matrix 220 corresponds to one class vector. Each column of the sparse matrix 220 corresponds to an attribute. The cell at the intersection of a particular column and a particular row of the sparse matrix 220 may store the aggregated attribute weight for the respective class (i.e., the class represented by the particular row) and the respective attribute (i.e., the attribute represented by the particular column). Note that the weight may be zero if the aggregated attribute weight was filtered out or if there is no association between the respective class and the respective attribute in the training set. Thus, matrix 220 may be sparse.

Class Length Normalization

In some implementations, the class vectors as stored in the class-attribute sparse matrix 220 are normalized to the unit length per class. Every class vector of the class-attribute sparse matrix 220 may be normalized separately. This "class length" normalization is useful for the calculation of cosine similarities as described below. The unit length normalization may be done by dividing every non-zero aggregated attribute weight $w_{ij}$ for class i by:

$$\sqrt{\sum_{j=1}^{N} w_{ij}^2}$$

The above equation represents the square root of the sum of the square of each non-zero aggregated attribute weight $w_j$ for class i. As a result of this normalization, each row of the class-attribute sparse matrix 220 equals one. In the above equation, N is the total number of non-zero weighted attributes in the class vector for class i.

Filtering the Class-Attribute Matrix

The class-attribute sparse matrix 220 may be filtered to reduce the storage size of the sparse matrix 220. In particular, the aggregated attribute weights in each column of the matrix are sorted in descending order. This is a per-attribute sorting. After sorting, a heuristic is applied to the sorted column values to filter out (discard) "weak" aggregated attribute weights in the column. A weak aggregated attribute weight is one that represents an attribute that has a weak association with a respective class.

One possible heuristic is to retain in the sparse matrix 220 only the N highest values aggregated attribute weights in the column. For example, the heuristic may retain no more than the 1,000 highest values in the column. The value N may be predetermined (e.g., configured by a user).

Another possible heuristic is to filter out (discard) all aggregated attribute weights in the column having values less than the value of a "fall-off" aggregated attribute weight in the column. The fall-off aggregated attribute weight may represent a steep decline in the sorted values. The fall-off aggregated attribute weight may be identified as the first value in the sorted column values that differs more than a threshold amount from the maximum value of the prior N column values in the sorted order. In this context, N may be 100, for example. Other heuristics are possible and implementations of the present invention are not limited to any particular heuristic.

Classification Step

Figure 5:
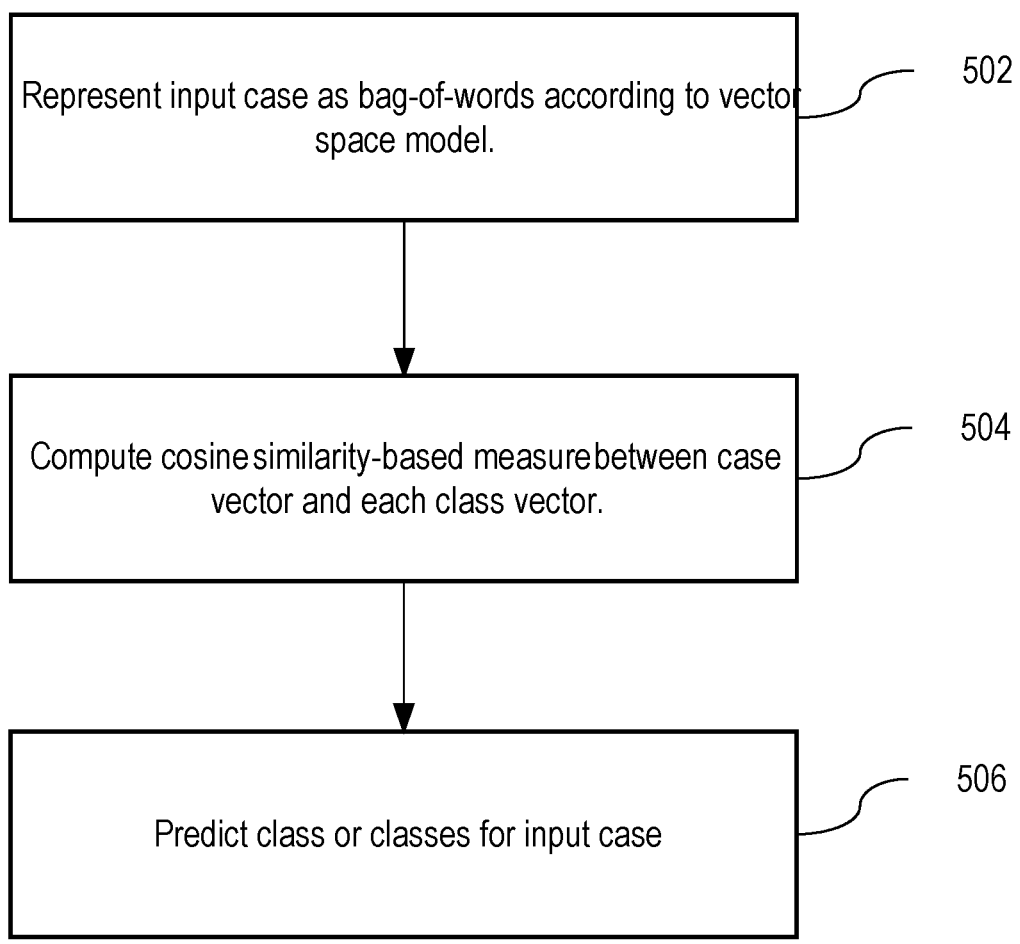
FIG. 5 is a flowchart of a classification step, according to some implementations of the present invention.

FIG. 5 is a flowchart of the classification step 230 according to some implementations of the present invention. In summary, the step proceeds by representing 502 an input case 232 as a vector of weighted attributes referred to herein as a case vector. Then, the case vector is projected 504 into the set of class vectors stored in the class-attribute sparse matrix 220. One or more classes closest to the case 232 in the projected space are selected 506 as predicted classes for the case 232. In some implementations, a weighted cosine similarity measure is used to determine the class vectors that are closest in similarity to the case vector.

At step 502, the classifier 234 represents the input case 232 as a bag-of-words according to the vector space model.

In some implementations, the input case 232 is a text document and the attribute weight of each distinct attribute of the input case 132 is computed as follows:

$$\frac{(k+1)tf_{t,d}}{tf_{t,d} + k\left(1 - b + b\frac{L_d}{L_{avg}}\right)}$$

Here, $tf_{t,d}$ is the frequency of n-gram t in the input case d. Parameters k, b, $L_d$, and $L_{avg}$ are as before. In some implementations, k is approximately 1.5 and b is approximately 0.75.

It should be noted that other weighting schemes are possible and the present invention is not limited to any particular attribute weighting scheme forming the case vector. Forming the case vector may also include unit length normalization such as described above with respect to the training data item vectors.

At step 504, the classifier 234 projects the case vector into a set of class vectors of the class-attribute sparse matrix 220. For example, the classier 234 may project the case vector into all class vectors of the matrix 220, or a selected subset thereof. To do this, the classifier 234 iterates over relevant class vectors of the sparse matrix 220 and computes a weighted similarity measure between each relevant class vector and the case vector v. A relevant class vector of the sparse matrix 220 is one that has a non-zero weight for at least one non-zero weighted attribute of the case vector. Typically, the number of class vectors of the sparse matrix 220 that are relevant to case vector will be much smaller than the total number of class vectors of the sparse matrix. Thus, by computing the similarity measure between the case vector and only the relevant class vectors, computing resources (e.g., processing and data storage resources) are conserved.

In some implementations, the following cosine similarity-based measure is used:

$$\sqrt{f(v, m, i)} \sum_{j=1}^{N} v_j \cdot m_{ij}$$

Here, the variable v represents the case vector and the variable $m_i$ represents the relevant class vector from the sparse matrix 200 for class i. The variable N represents the total number non-zero weighted attributes of the case vector v. The variable $v_j$ represents the weight of the jth attribute from the relevant case vector v. The variable $m_{ij}$ represents the weight of the $j^{th}$ attribute from the relevant class vector $m_i$. $\Sigma_{j=1}^{N} v_j \cdot m_{ij}$ represents the cosine similarity between case vector v and relevant class vector $m_i$. This cosine similarity is weighted by the square root of f(v, m, i) which represents the number of attributes that have non-zero weights in both the case vector v and the relevant class vector $m_i$. This weight effectively boosts the similarity measure for classes that have more non-zero weighted attributes in common with the case vector. Note that instead of the square root, a logarithm of the number of attributes that have non-zero weights in both the case vector v and the relevant class vector $m_i$ could be used instead. Also, a Jaccard distance between the sets of non-zero weights in the case vector v and the relevant class vector $m_i$ could be used instead of a count of the number of attributes that have non-zero weights in both the case vector v and the relevant class vector $m_i$. More generally, the cosine similarity-based measure used at step 504 can be based on a cosine similarity measure between the case vector v and the class vector $m_i$ and a weight that effectively boosts the cosine similarity measure as a function of the number of attributes that have non-zero weights in both the case vector v and the class vector $m_i$.

At step 506, one or more classes for the input case 232 are predicted. Whether just one class is predicted for the input case 232 or more than one class is predicted for the input case 232 may be determined according to configuration (e.g., user configuration) or otherwise as dictated by the requirements of the particular implementation at hand. In either case, the predicted class or classes are those with the highest weighted cosine similarity measures as computed in step 504. For example, the classes represented by the top N closest class vectors to the case vector according to the respective weighted cosine similarity measures may be selected as the predicted classes for the input case 232. Alternatively, all classes represented class vectors with a weighted cosine similarity measure above a threshold may be selected as the predicated classes for the input case 232. In the case where only a single class is predicted for the input case 232, the class represented by the closest class vector to the case vector according to the respective weighted cosine similarity measure may be selected as the predicted class for the input case 232.

Steps 502, 504, and 506 may be repeated to efficiently classify a stream of input cases in real-time. The efficient real-time classification of a stream of input cases is possible even for a large number of classes (e.g., tens or hundreds of thousands of classes or more) and/or a large number of training data items (e.g., millions or more) using modern computing power. The efficient real-time classification is facilitated by aggregating the training data item vectors by class and by the filtering performed on the class-attribute sparse matrix. The filtering reduces the number of non-zero weight values in the sparse matrix during the classification step. As such, the filtering reduces the storage size of the sparse matrix, allowing for faster model load and scoring using the sparse matrix.

Semantic Text Summarization

In some implementations, explicit semantic analysis for computing semantic relatedness is repurposed for computing a text summary of a given text document. More specifically, the text summary is derived based on word embeddings. In other words, the context of n-grams (e.g., words) is captured for purpose of determining semantic similarity, in contrast to typical similarity measures such as cosine on bag of words or edit distance on strings.

The given text document can be an article, a web page, or other piece text for which a text summary is desired. As with the classification approach described herein, the text is not limited to written language but may include other human-readable symbols, numbers, charts, tables, equations, formulas, etc.

The text summary approach using explicit semantic analysis operates generally as follows: (1) grammatical units (e.g., sentences or words) are extracted from the given text document using any known technique for identifying and extracting such units, (2) each of the extracted grammatical units and the text document are represented as weighted vectors of knowledge base concepts, (3) the semantic relatedness between the text document as a whole and each grammatical unit is computed using the weighted vectors, and (4) one or more of the grammatical units most semantically relatedly to the text document as a whole are selected for inclusion in a text summary of the text document.

Figure 6:
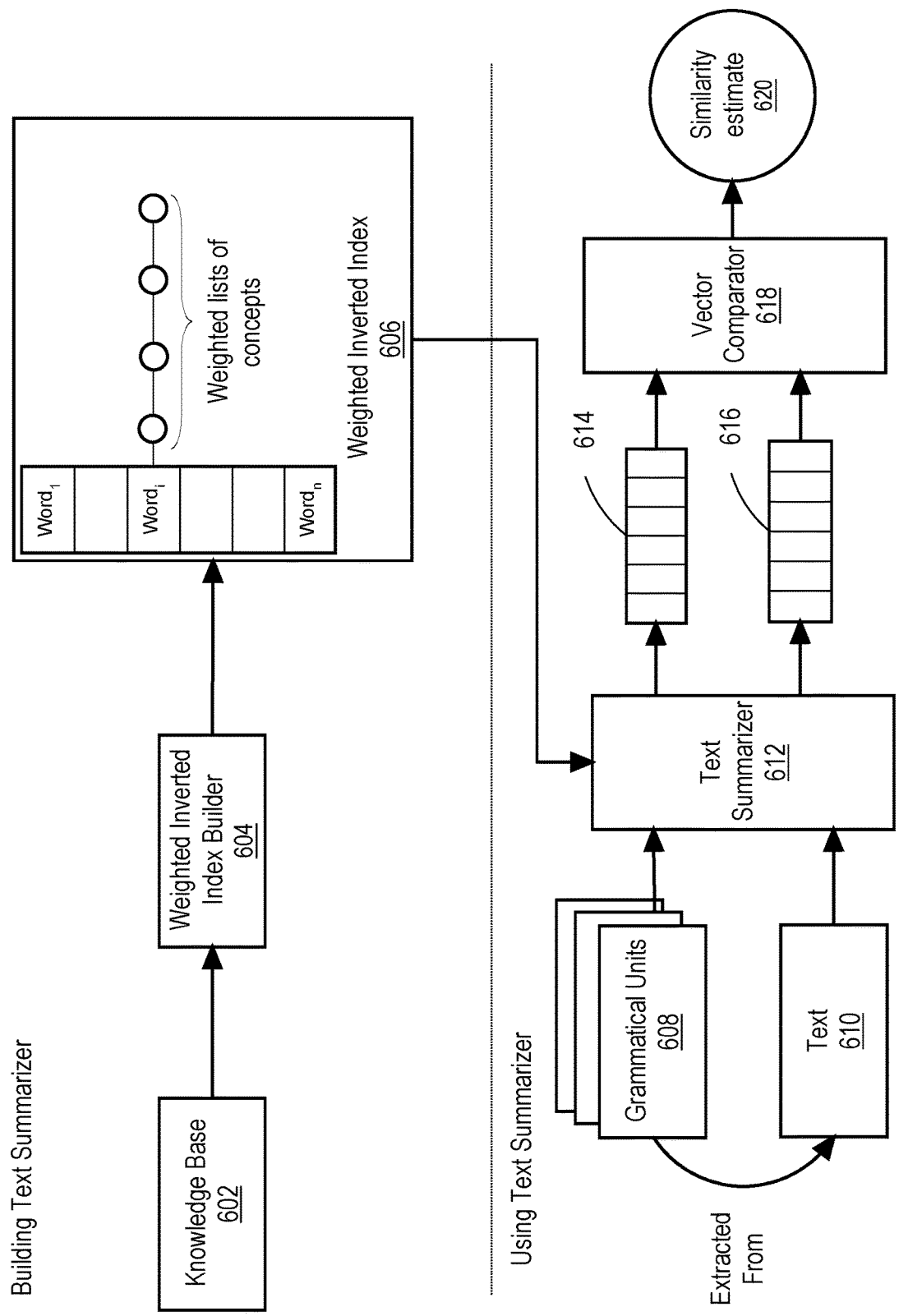
FIG. 6 is a schematic diagram of a text summarization and keyword generation system, according to some implementations of the present invention.

FIG. 6 illustrates text summarization using explicit semantic analysis. First a text summarizer is built based on a knowledge base 602. The knowledge base 602 can be general or domain-specific. An example of a general knowledge base is a collection of encyclopedia articles such as a collection of Wikipedia articles or other encyclopedic collection of text articles. However, the knowledge base 602 can instead be domain-specific such as a collection of text articles specific to a particular technical field such as a collection of medical, scientific, engineering, or financial articles.

Each article of the knowledge base 602 is represented as an attribute vector of n-grams (e.g., words) that occur in the article. Entries in the attribute vector are assigned weights. For example, the weights may be used using a term frequency-inverse document frequency scoring scheme. The weights in the attribute vector for an article quantify the strength of association between the n-grams (e.g., words) of the article and the article as a concept.

In some implementations, the term frequency-inverse document frequency scoring scheme computes a weight for a given n-gram t of a given article document d as represented by the following equation:

$$\frac{(k+1) tf_{t,d}}{tf_{t,d} + k\left(1 - b + b\frac{L_d}{L_{avg}}\right)} \cdot \log \frac{M - df_t + 0.5}{df_t + 0.5}$$

Here, $tf_{t,d}$ represents the frequency of n-gram t in document d. And d $f_t$ represents the document frequency of n-gram t in the knowledge base 602. Parameters M, k, b, $L_d$, and $L_{avg}$ are like as before except with reference to knowledge base 602 instead of a training set used for classification. In some implementations, k is approximately 1.5 and b is approximately 0.75.

The preceding is one example of a term frequency-inverse document frequency scoring scheme that may be used to weight attributes of an attribute vector. Other statistical measures that reflect how important an attribute (e.g., an n-gram) is to an article in the knowledge base 602 may be used. For example, other TF/IDF variations such as BM25F that takes anchor text into account may be used with certain types knowledge bases such as, for example, a knowledge base of web pages or other set of hyperlinked documents.

A weighted inverted index builder computer 604 builds a weighted inverted index 606 from the attribute vectors representing the articles of the knowledge base 602. The weighted inverted index 606 maps each distinct n-gram represented in the set of attribute vectors to a concept vector of concepts (articles) in which the n-gram appears. Each concept in the concept vector may be weighted according to the strength of association between the concept and the n-gram to which the concept vector is mapped by the weighted inverted index 606. In some implementations, the indexer computer 604 uses the inverted index 606 to discard insignificant associations between n-grams and concepts by removing from the concept vectors those concepts whose weights for a given n-gram are below a threshold.

To generate a text summary of a given text document 610, grammatical units 608 are extracted from a given text document 610 and the semantic relatedness between each grammatical unit and the given text document 610 is computed. A number of grammatical units having a high degree of semantic relatedness to the given text document 610 are selected for inclusion in the text summary.

The number of grammatical units that are selected for inclusion in the text summary may vary based on a variety of different factors. One approach is to select a predefined number of grammatical units. For example, the predefined number may be configured by a user of the system or learned by a machine learning process. Another approach is to select all grammatical units having a degree of semantic relatedness to the given text document 610 that is above a predefined threshold. The predefined threshold can be configured by a user of the system or learned by a machine learning process. Yet another possible approach is determine the grammatical unit having the highest degree of semantic relatedness to the given text document 610 and then selecting all other grammatical units where the difference in the degree of semantic relatedness to the given text document 610 of the grammatical unit and the highest degree is below a predefined threshold. The grammatical unit having the highest degree and any other grammatical units below the predefined threshold are selected for inclusion in the text summary. Again, the predefined threshold can be configured by a user of the system or learned by a machine learning process.

In some implementations, a grammatical unit having the highest or a relatively high degree of semantic relatedness to the given text document 610 is not always selected for inclusion in the text summary. For example, a first grammatical unit that has a lower degree of semantic relatedness to the given text document 610 than a second grammatical unit may be selected for inclusion in the text summary and the second grammatical unit may not be selected for inclusion in the text summary if the first grammatical unit is not sufficiently dissimilar with respect to the grammatical units that have already been selected for inclusion in the text summary. The extent of a grammatical unit's dissimilarity with respect to the existing text summary can be measured in a variety of different ways such as, for example, by using lexical approach, a probabilistic approach, or a hybrid of the lexical approach and the probabilistic approach. Using a dissimilarity measure to select grammatical units for inclusion in the text summary can prevent multiple similar grammatical units from being included in the same text summary.

In some implementations, other techniques for selecting a number of grammatical units for inclusion in the text summary as a function of the units' semantic relatedness to the given text document 610 and its dissimilarity relative to one or more of the other units may be used and the present invention is not limited to any particular technique. For example, given a number of grammatical units with a semantic relatedness to the given text document 610 above a threshold, the dissimilarity of each composite grammatical unit with respect the combination of the number of grammatical units may be measured and a number of grammatical units that are most dissimilar to each other may be selected for inclusion in the text summary. As a result, the grammatical units selected for inclusion in the text summary are highly semantically related to the text document, as a whole, yet dissimilar from each other. This is a more useful text summary than one containing highly semantically related but similar grammatical units because similar grammatical units are more likely to be redundant of each other in terms of the information conveyed by the grammatical units than dissimilar grammatical units.

Another possibility is to compute a composite similarity/dissimilarity measure for grammatical units and then select grammatical units for inclusion in the text summary based on their composite scores. For example, the composite measure might be a weighted average of the semantic relatedness measure and a dissimilarity measure. For example, a possible composite measure computed as a weighted average is:

$$(a*\text{Similarity})+(b*\text{Dissimilarity})$$

Here, the parameter Similarity represents the semantic relatedness of a grammatical unit to the input text 610 as a whole. For example, the parameter Similarity could be the similarity estimate 620 computed for the grammatical unit. The parameter Dissimilarity represents a dissimilarity measure of the dissimilarity of the grammatical unit to the set of one or more grammatical units. For example, the set of one or more grammatical units can be a set of one or more grammatical units that are already selected for inclusion in the text summary. The parameter a represents the weight applied to the similarity measure in the weighted average. The parameter b represents the weight application to the dissimilarity measure in the weighted average. The composite measure effectively balances the similarity measure and the dissimilarity measure against each other. They can be balanced against each other equally (e.g., a=0.5 and b=0.5). Alternatively, the similarity measure may be given more weight (e.g., a=0.8 and b=0.2).

A grammatical unit extracted from the given text document can be a sentence, a phrase, a paragraph, a word, an n-gram, or other grammatical unit. In the case, where the grammatical units 608 extracted from the given text document 610 are words or n-grams, the process may be viewed as keyword generation, as opposed to text summarization.

The text summarizer 612 accepts a piece of text. The piece of text is the given text document 610 or a grammatical unit thereof. The piece of text is represented as an "input" vector of weighted attributes (e.g., words or n-grams) of the piece of text. Each weight in the input vector is for a corresponding attribute (e.g., word or n-gram) identified in the piece of text and represents the strength of association between the piece of text and the corresponding attribute. For example, the weights may be calculated according to a TF-IDF scheme or the like.

In some implementations, the weight of an attribute in the input vector is computed as follows:

$$\frac{(k+1)tf_{t,d}}{tf_{t,d} + k\left(1 - b + b\frac{L_d}{L_{avg}}\right)}$$

Here, $tf_{t,d}$ is the frequency of n-gram t in the piece of text d. Parameters k, b, $L_d$, and $L_{avg}$ are as before except with respect to knowledge base 602 instead of a classification training set. In some implementations, k is approximately 1.5 and b is approximately 0.75.

It should be noted that other weighting schemes are possible and the present invention is not limited to any particular weighting scheme when forming the input vector. Forming the input vector may also include unit length normalization such as described above with respect to the training data item vectors.

The text summarizer 612 iterates over the non-zero weighted attributes of the input vector formed based on the piece of text, retrieves attribute vectors corresponding to the attributes from the weighted inverted index 606, and merges the retrieved attribute vectors into a weighted vector of concepts that represents the piece of text. This weighted vector of concepts is referred to hereinafter as a "concept" vector.

The attribute vectors retrieved from the weighted inverted index 606 corresponding to the attributes of the input vector are also each a vector of weights. However, the weights in the attribute vector quantify the strength of association between respective concepts of the knowledge base 602 and the attribute mapped to the attribute vector by the inverted index 606.

The text summarizer 612 creates a concept vector for the piece of text. The concept vector is a vector of weights. Each weight in the concept vector represents the strength of association between a respective concept of the knowledge base 602 and the piece of text. A concept weight in the concept vector is computed by the text summarizer 612 as a sum of values, one value for each attribute non-zero weighted in the input vector. Each value for an attribute of the sum is computed as the product of (a) the weight of the attribute in the input vector and (b) the weight of the concept in the attribute vector for the attribute. Each concept weight in the concept vector reflects the relevance of the concept to the piece of text. In some implementations, the concept vector is normalized. For example, the concept vector may be normalized for unit length or concept length (e.g., like class length above).

The text summarizer 612 may generate a concept vector 616 for the input text 610 and a concept vector 614 for each of the grammatical units 608. The vector comparator 618 compares a concept vector 614 generated for a grammatical unit to the concept vector 616 generated for the input text 610 using a similarity measure to generate a similarity estimate 620. In some implementations, a cosine similarity measure is used. Implementations are not limited to any particular similarity measure and any similarity measure capable of measuring the similarity between two non-zero vectors may be used.

The similarity estimate 620 quantifies the degree of semantic relatedness between a grammatical unit and the input text 610 from which the grammatical unit was extracted. For example, the similarity estimate 620 may be a value between 1 and 0 inclusive with values closer to 1 representing a higher degree of semantic relatedness and values closer to 0 representing a lower degree of semantic relatedness.

A similarity estimate 620 may be computed for each of the grammatical units 608. The similarity estimates 620 generated for the grammatical units 608 may be used to select one or more of the grammatical units 608 for inclusion in a text summary of the input text 610 (or to select one or more keywords for keyword generation for the input text 610).

There a variety of applications of the above technique for text summarization to provide an accurate text summary of longer text such as, for example, news stories, blog posts, journal articles, web pages, etc.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
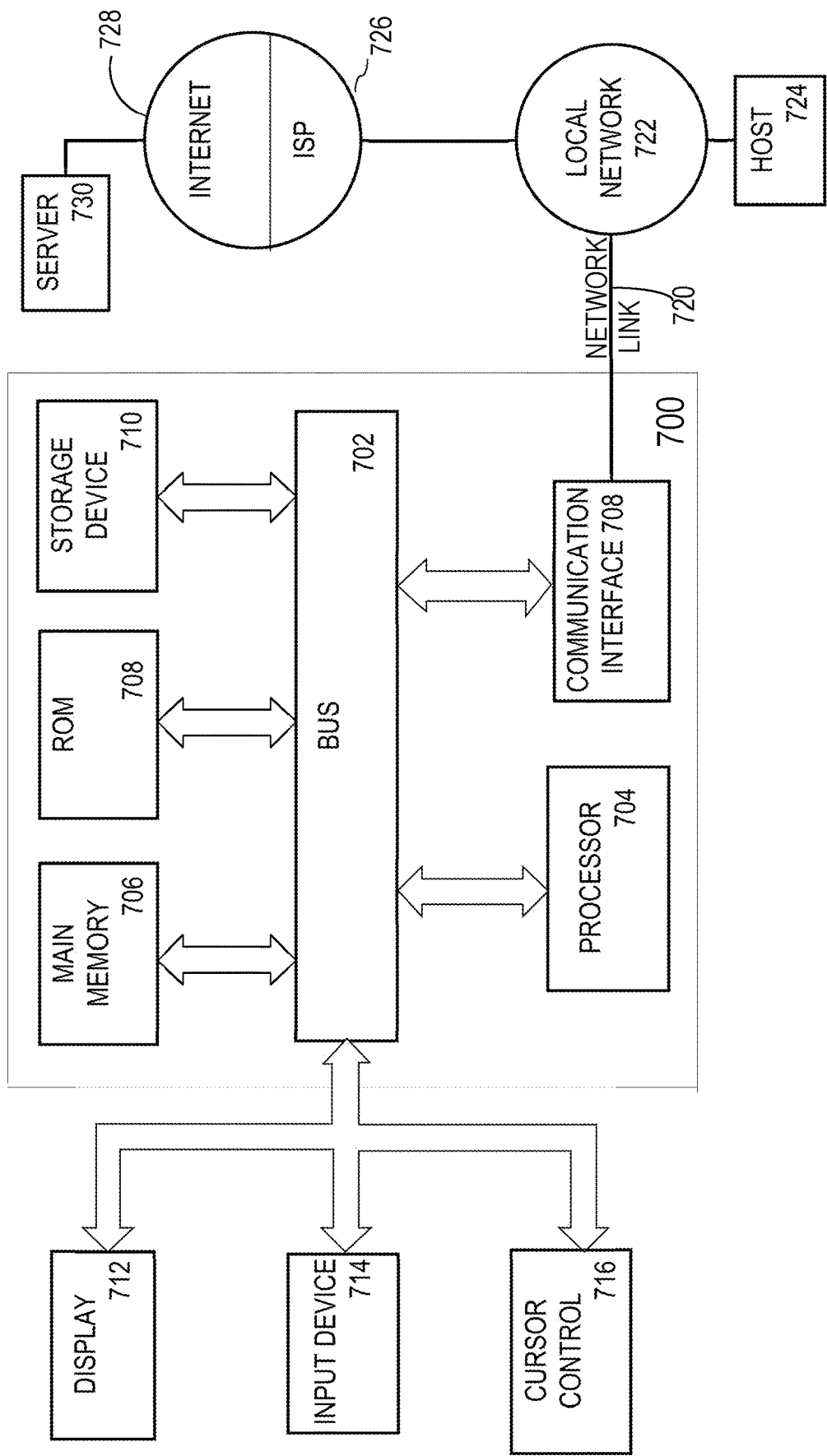
FIG. 7 illustrates a basic computer system on which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
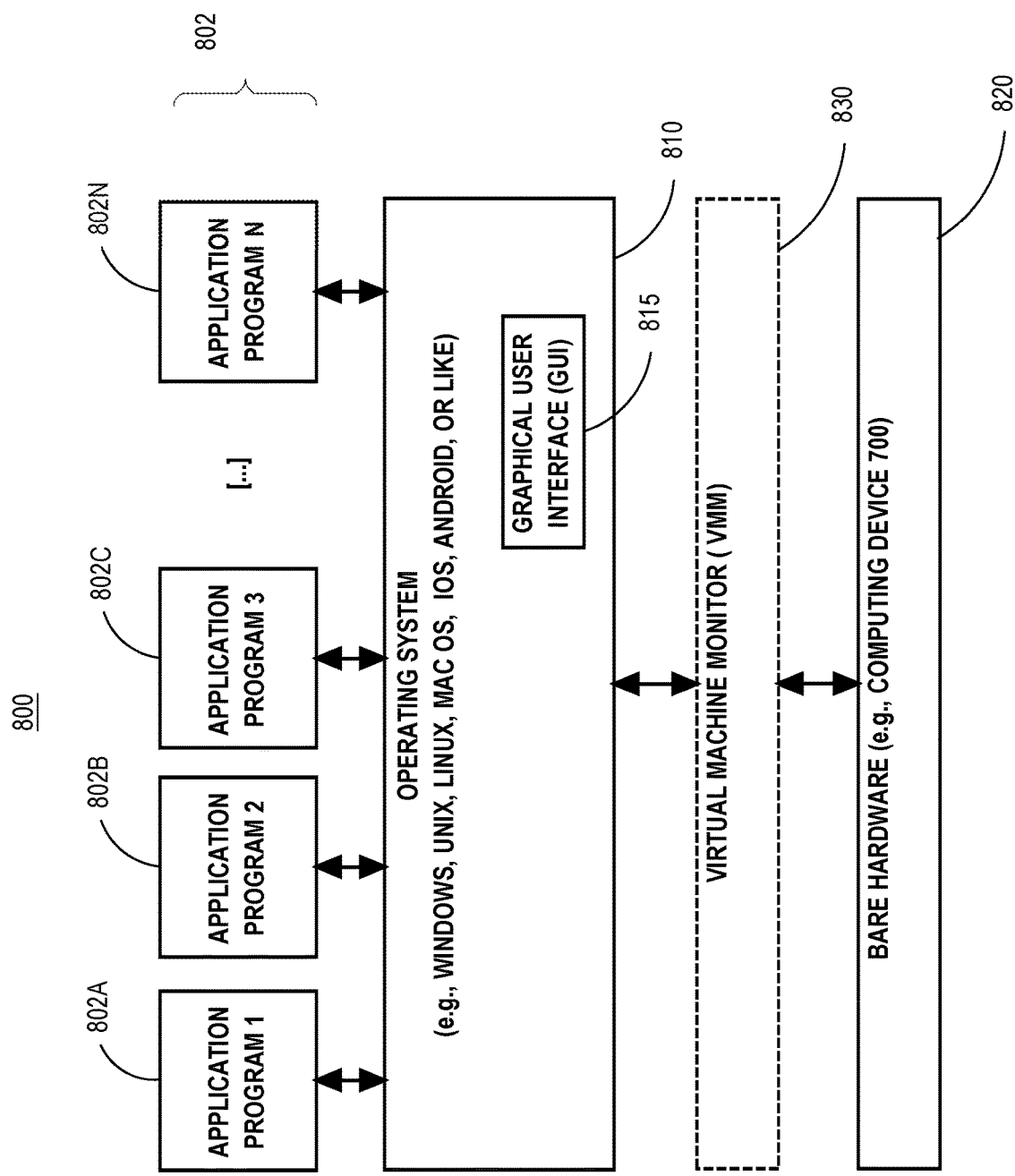
FIG. 8 illustrates a basic software system for controlling the operation of the computer system.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for explicit semantic analysis-based large-scale classification of a stream of text documents performed by a computing system comprising one or more processors and storage media, the storage media storing one or more programs executed by the one or more processors to perform the method, the method comprising:

aggregating a set of training data item vectors by class to produce a set of class vectors, wherein each training data item vector of the set of training data item vectors represents a respective text document in a knowledge base of text documents, wherein each class vector of the set of class vectors represents a respective class in a set of classes and aggregates weight values by attribute from one or more training data item vectors of the set of training data item vectors that belong to the respective class, the set of classes corresponding to concepts of the knowledge base of text documents, each training data item vector in the set of training data item vectors belonging to one or more classes of the set of classes;

sorting sets of aggregate weight values of the set of class vectors to produce a plurality of sorted aggregate weight values;

selecting, for each set of sorted aggregate weight values in the plurality of sorted aggregate weight values, based on a magnitude difference between (a) a particular fall-off weight value in the set of sorted aggregate weight values and (b) a maximum aggregate weight value among a predetermined number of aggregate weight values in the set of sorted aggregate weight values, aggregate weight values in the set of sorted aggregate weight values to not include in a set of filtered class vectors, wherein the predetermined number of aggregate weight values are prior in sorted order to the particular fall-off weight value in the set of sorted aggregate weight values;

storing a sparse matrix in storage media, the sparse matrix comprising the set of filtered class vectors;

obtaining a case vector representing an input text document case to be classified;

computing a plurality of weighted similarity measures based on the case vector and a plurality of class vectors of the sparse matrix;

predicting a particular class, of the set of classes, to which the input text document case belongs, based on a particular weighted similarity measure of the plurality of weighted similarity measures; and repeating the obtaining, computing, and predicting for each input text document case of a stream of additional input text document cases to be classified.

2. The method of claim 1, wherein the set of training data item vectors contains at least two million training data item vectors.

3. The method of claim 1, wherein each class vector of the plurality of class vectors is normalized.

4. The method of claim 1, wherein the set of aggregate weight values of a particular class vector of the set of class vectors contains more than 1,000 aggregate weight values.

5. The method of claim 1, wherein the set of class vectors contains at least 200,000 class vectors.

6. The method of claim 1, wherein the predetermined number of aggregate weight values is 100.

7. The method of claim 1, further comprising:
predicting a plurality of particular classes, of the set of classes, to which the input text document case belongs, based on a plurality of particular weighted similarity measures of the plurality of weighted similarity measures.

8. The method of claim 1, wherein each weighted similarity measure of the plurality of weighted similarity measures is computed based on (a) a similarity measure computed between the case vector and a respective class vector of the plurality of class vectors of the sparse matrix, and (b) a weight applied to the similarity measure, the weight computed based on a number of attributes that are weighted by a non-zero weight value in both the case vector and the respective class vector.

9. One or more non-transitory computer-readable media storing one or more programs for execution by one or more processors, the one or more programs for explicit semantic analysis-based large-scale classification of a stream of text documents and comprising instructions configured for:
aggregating a set of training data item vectors by class to produce a set of class vectors, wherein each training data item vector of the set of training data item vectors represents a respective text document in a knowledge base of text documents, wherein each class vector of the set of class vectors represents a respective class in a set of classes and aggregates weight values by attribute from one or more training data item vectors of the set of training data item vectors that belong to the respective class, the set of classes corresponding to concepts of the knowledge base of text documents, each training data item vector in the set of training data item vectors belonging to one or more classes of the set of classes;

sorting sets of aggregate weight values of the set of class vectors to produce a plurality of sorted aggregate weight values;

selecting, for each set of sorted aggregate weight values in the plurality of sorted aggregate weight values, based on a magnitude difference between (a) a particular fall-off weight value in the set of sorted aggregate weight values and (b) a maximum aggregate weight value among a predetermined number of aggregate weight values in the set of sorted aggregate weight values, aggregate weight values in the set of sorted aggregate weight values to not include in a set of filtered class vectors, wherein the predetermined number of aggregate weight values are prior in sorted order to the particular fall-off weight value in the set of sorted aggregate weight values;

storing a sparse matrix in storage media, the sparse matrix comprising the set of filtered class vectors;

obtaining a case vector representing an input text document case to be classified;

computing a plurality of weighted similarity measures based on the case vector and a plurality of class vectors of the sparse matrix;

predicting a particular class, of the set of classes, to which the input text document case belongs, based on a particular weighted similarity measure of the plurality of weighted similarity measures; and repeating the obtaining, computing, and predicting for each input text document case of a stream of additional input text document cases to be classified.

10. The one or more non-transitory computer-readable media of claim 9, wherein the set of training data item vectors contains at least two million training data item vectors.

11. The one or more non-transitory computer-readable media of claim 9, wherein each class vector of the plurality of class vectors is normalized.

12. The one or more non-transitory computer-readable media of claim 9, wherein the set of aggregate weight values of a particular class vector of the set of class vectors contains more than 1,000 aggregate weight values.

13. The one or more non-transitory computer-readable media of claim 9, wherein the set of class vectors contains at least 200,000 class vectors.

14. The one or more non-transitory computer-readable media of claim 9, wherein the predetermined number of aggregate weight values is 100.

15. The one or more non-transitory computer-readable media of claim 9, the instructions further configured for:
predicting a plurality of particular classes, of the set of classes, to which the input text document case belongs, based on a plurality of particular weighted similarity measures of the plurality of weighted similarity measures.

16. The one or more non-transitory computer-readable media of claim 9, wherein each weighted similarity measure of the plurality of weighted similarity measures is computed based on (a) a similarity measure computed between the case vector and a respective class vector of the plurality of class vectors of the sparse matrix, and (b) a weight applied to the similarity measure, the weight computed based on a number of attributes that are weighted by a non-zero weight value in both the case vector and the respective class vector.

17. A computing system comprising:
one or more processors;
storage media; and
one or more programs for execution by the one or more processors stored in the storage media, the one or more programs for explicit semantic analysis-based large-scale classification of a stream of text documents and comprising instructions configured for:
aggregating a set of training data item vectors by class to produce a set of class vectors, wherein each training data item vector of the set of training data item vectors represents a respective text document in a knowledge base of text documents, wherein each class vector of the set of class vectors represents a respective class in a set of classes and aggregates weight values by attribute from one or more training data item vectors of the set of training data item vectors that belong to the respective class, the set of classes corresponding to concepts of the knowledge base of text documents, each training data item vector in the set of training data item vectors belonging to one or more classes of the set of classes;
sorting sets of aggregate weight values of the set of class vectors to produce a plurality of sorted aggregate weight values;
selecting, for each set of sorted aggregate weight values in the plurality of sorted aggregate weight values, based on a magnitude difference between (a) a particular fall-off weight value in the set of sorted aggregate weight values and (b) a maximum aggregate weight value among a predetermined number of aggregate weight values in the set of sorted aggregate weight values, aggregate weight values in the set of sorted aggregate weight values to not include in a set of filtered class vectors, wherein the predetermined number of aggregate weight values are prior in sorted order to the particular fall-off weight value in the set of sorted aggregate weight values;
storing a sparse matrix in storage media, the sparse matrix comprising the set of filtered class vectors;
obtaining a case vector representing an input text document case to be classified;
computing a plurality of weighted similarity measures based on the case vector and a plurality of class vectors of the sparse matrix;
predicting a particular class, of the set of classes, to which the input text document case belongs, based on a particular weighted similarity measure of the plurality of weighted similarity measures; and
repeating the obtaining, computing, and predicting for each input text document case of a stream of additional input text document cases to be classified.

18. The computing system of claim 17, wherein the set of training data item vectors contains at least two million training data item vectors.

19. The computing system of claim 17, wherein each class vector of the plurality of class vectors is normalized.

20. The computing system of claim 17, wherein the set of aggregate weight values of a particular class vector of the set of class vectors contains more than 1,000 aggregate weight values.

21. The computing system of claim 17, wherein the set of class vectors contains at least 200,000 class vectors.

22. The computing system of claim 17, wherein the predetermined number of aggregate weight values is 100.

23. The computing system of claim 17, the instructions further configured for:
predicting a plurality of particular classes, of the set of classes, to which the input text document case belongs, based on a plurality of particular weighted similarity measures of the plurality of weighted similarity measures.

24. The computing system of claim 17, wherein each weighted similarity measure of the plurality of weighted similarity measures is computed based on (a) a similarity measure computed between the case vector and a respective class vector of the plurality of class vectors of the sparse matrix, and (b) a weight applied to the similarity measure, the weight computed based on a number of attributes that are weighted by a non-zero weight value in both the case vector and the respective class vector.

* * * * *